UNITED STATES PATENT OFFICE.

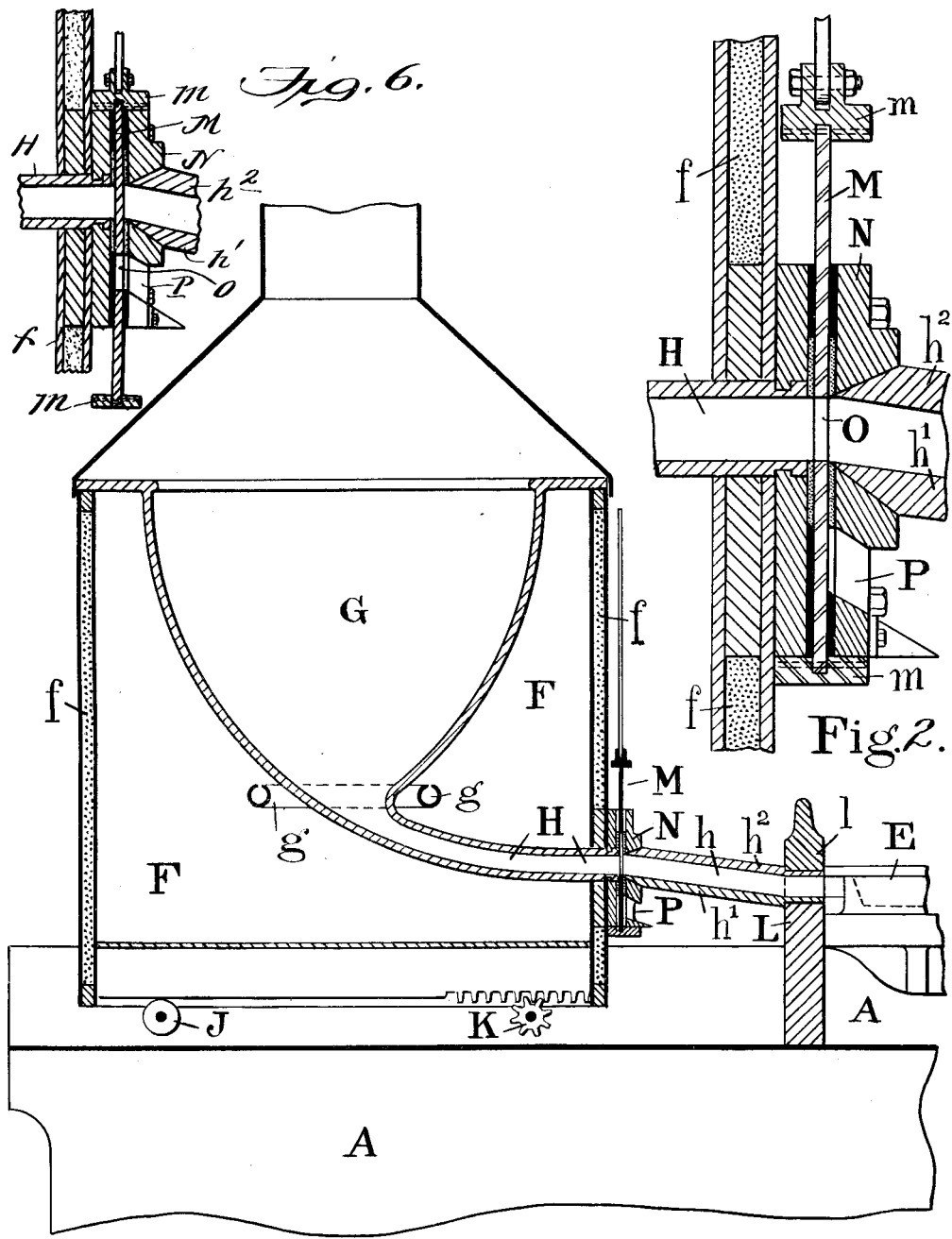

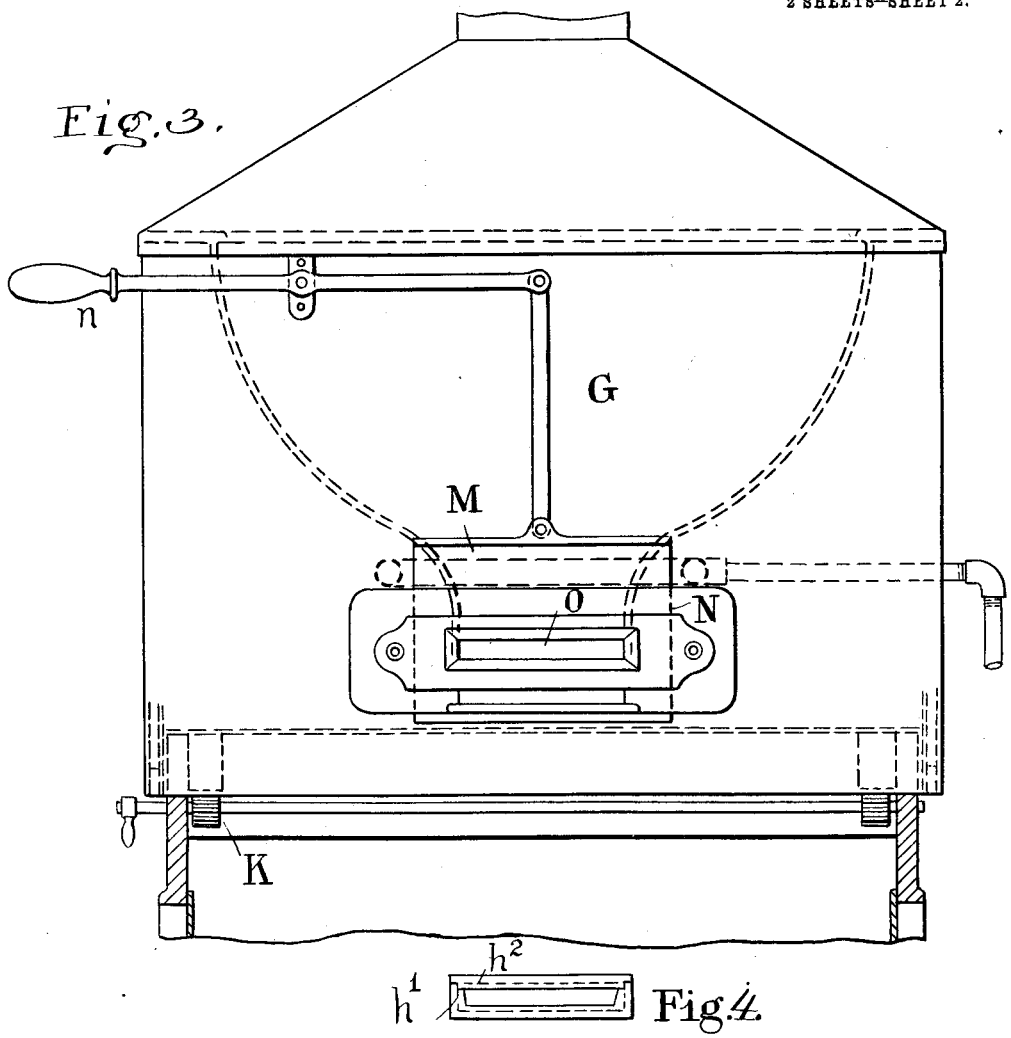
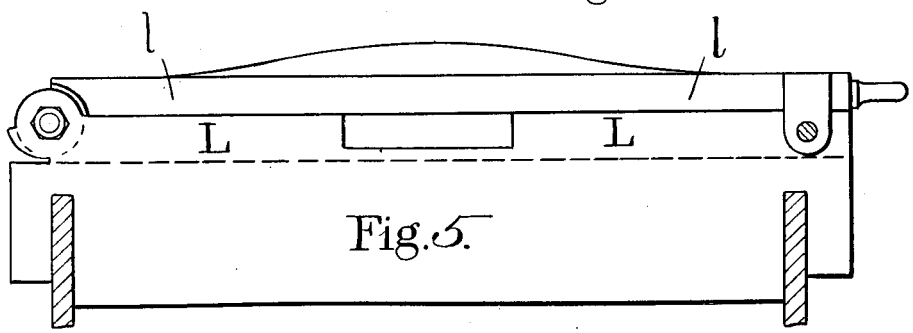

ARTHUR DUTTON, OF RUNCORN, ENGLAND.

APPARATUS FOR MAKING STEREOTYPE AND LIKE BLOCKS.

1,065,301.  Specification of Letters Patent.  Patented June 17, 1913.

Application filed December 13, 1909. Serial No. 532,870.

*To all whom it may concern:*

Be it known that I, ARTHUR DUTTON, British subject, and residing at Runcorn, county of Chester, England, have invented certain new and useful Improvements in Apparatus for Making Stereotype and Like Blocks, of which the following is a specification.

This invention relates to apparatus for the manufacture of stereotype blocks and is designed to provide a simple, handy, effective and cheap apparatus, which will enable a printer to manufacture such blocks with greatly increased ease and celerity.

The invention consists essentially of a horizontal table preferably of metal and heated in any suitable manner provided with a small press preferably capable of sliding lengthwise of the table, combined within an improved melting pot and pourer which may or may not be adjustable and is preferably arranged so that the molten metal is capable of flowing therefrom into the mold which is arranged flat upon the table.

The invention will be described with reference to the accompanying drawings in which one arrangement of apparatus is shown.

Figure 1 is a transverse section through the melting pot and pourer. Fig. 2 is a detail section to enlarged scale of the pourer valve. Fig. 3 is a front view of the melting pot and pourer valve. Fig. 4 is a front elevation of the extremity of the pourer. Fig. 5 is a detail of pourer clamp. Fig. 6 is a view similar to Fig. 2, but showing the valve plate in a different position.

The apparatus is mounted on a table A of any suitable form which may be adapted to stand upon the floor as shown or upon a bench or in any other suitable position.

At one end of the table A is mounted in a suitable heating chamber F a melting pot G which may be heated in any suitable way such as by a Bunsen burner $g$ as shown. The fumes from the burner and from the hot metal pass away by a suitable chimney or cover.

The walls of the heating chamber F are preferably made double and filled in with asbestos or other non-conducting material $f$ to maintain the outside of the chamber fairly cool.

The melting pot G is provided with a gate or pourer H projecting over the table at the end and preferably adapted to direct the metal through the side of the horizontally arranged mold E. The melting pot is preferably arranged at such a level that the molten metal in the pot G and the pourer H is capable of flowing therefrom into the mold.

The heating chamber F and melting pot G are preferably mounted on a slide, runners, a rack and pinion arrangement or the like in such a way that they can be moved to adjust the mouth of the pourer directly to, against, or into the end or bridge portion $h$ of the pourer or into the opening of the mold to direct the metal thereinto. A joint roller J and rack and pinion arrangement K are shown in the drawings (see Figs. 1 and 3) for this purpose. The end or bridge portion $h$ of the pourer H may be made in two parts $h'$ and $h^2$ removably connected together in a suitable manner so that the tang of metal which solidifies in the portion $h$ can be easily removed from the same and cut away from the block after it has been removed from the mold.

As shown in Fig. 4, the lower part $h'$ may be made with inclined sides so that any metal solidifying in it can easily be removed therefrom, the upper part $h^2$ being made flat to rest on top of the lower part.

The mouth of the pourer H (see Fig. 2) is made taper and the extremities of the parts $h'$ and $h^2$ of the end or bridge portion $h$ are chamfered or inclined so that when the pourer is racked up to same they are pressed tightly together, said mouth being formed in a head N referred to hereinafter. The other ends of the parts $h'$ and $h^2$ preferably extend into a bridge piece L (see Fig. 5) formed on the table and against which the mold is preferably wedged tightly before pouring, said bridge piece being formed with an opening for the pouring of the metal. Over the bridge piece L is arranged a clamp $l$ adapted to close down and secure the ends of the parts $h'$ and $h^2$ extending thereinto.

The pourer H is provided with a valve or slide of suitable construction adapted to open and close same which may be operated in any convenient way by hand, foot or otherwise.

A suitable arrangement, see Figs. 1 to 3, consists of a cut-off plate M adapted to be raised or lowered in a guide slot formed in a suitable head N by means of a handle $n$ or other suitable means. The plate M is formed with an opening O of a size equal to that of the pourer and arranged so that this opening can be made to coincide with the pourer passage when a mold is to be poured. When the pouring operation has been completed the plate M is lowered till the opening O coincides with an opening P of equal size formed in the lower part of the head N whereupon the molten metal contained in said opening O will be free to escape through opening P and hence will be prevented from solidifying in opening O and clogging up the same. Stops m are preferably attached to the ends of plate M so that the said plate is arrested at the right positions when it is operated.

Means may also be provided for adjusting or varying the amount of the opening of the pourer.

When the pourer H is adjusted into position with reference to the mold, which has previously been clamped in place, the valve M is opened and the mold poured.

The head of metal causes it to flow in with considerable force and thoroughly to enter all crevices in the matrix. The valve M is then closed, the heating chamber F and melting pot G are racked back, the parts $h'$ $h^2$ of the end or bridge portion $h$ of the pourer are then opened, the mold clamp is released and the completed block removed. All that is necessary to finish the block is to remove the pouring tang and trim it up.

This apparatus is specially applicable for use with the gages and matrices described in my concurrent applications for patents filed December 13, 1909, Serial Nos. 532868 and 532869. When employed with them the manufacture of blocks is very much simplified and the uses to which they can be put may be greatly increased.

What I claim as my invention and desire to protect by Letters Patent is:—

1. The combination of a melting pot; a pourer leading from said pot; and a valve mechanism associated with said pourer, said mechanism comprising a slotted head having an opening formed therein with which the mouth of the pourer directly communicates and having a second opening located below the first-named opening, a cut-off plate slidable in the slot in said head and formed with an opening, and means for moving said plate bodily, to bring the opening therein into registration with either the first or the second named opening.

2. The combination of a melting pot having a pourer leading therefrom; a head wherein the mouth of said pourer is formed; a bridge constituting a continuation of said pourer and having one of its ends fitted in said mouth; means for supporting the other end of said bridge; and a valve movable in said head for opening and closing communication between said pourer and said bridge.

3. The combination of a melting pot having a pourer leading therefrom; a head wherein the mouth of said pourer is formed; a bridge constituting a continuation of said pourer and having one of its ends fitted in said mouth, said bridge comprising upper and lower portions removably connected together; means for supporting the other end of said bridge; and a valve movable in said head for opening and closing communication between said pourer and said bridge.

4. The combination of a melting pot having a pourer leading therefrom; a head wherein the mouth of said pourer is formed, said head having an opening formed therein below said mouth; a bridge constituting a continuation of said pourer and having one of its ends fitted in said mouth; means for supporting the other end of said bridge; a cut-off plate slidable in said head and formed with an opening; and means for moving said plate bodily to bring the opening therein into and out of registration with either said mouth or said first-named opening.

5. The combination, with a table and a track thereon; of a heating chamber arranged to travel bodily on said track; a melting pot located within said chamber and provided with a pourer terminating in a mouth located exteriorly of said chamber; a bridge supported upon said table and having one of its ends arranged to fit in said mouth; and means for moving said chamber toward and from said bridge.

6. The combination of a melting pot having a pourer leading therefrom; a head having a pair of openings formed therein, with one of which openings the mouth of the pourer directly communicates; a valve movable in said head and formed with an opening; and means for operating said valve to bring the opening therein into registration with either of the openings in said head.

In witness whereof, I have hereunto signed my name in the presence of two subscribing witnesses.

ARTHUR DUTTON.

Witnesses:
J. OWDEN O'BRIEN,
B. T. WOODHEAD.